(12) United States Patent
Heffernan

(10) Patent No.: US 10,711,475 B1
(45) Date of Patent: Jul. 14, 2020

(54) SWIMMING POOL CLEANER WITH PLEATED MEDIUM FILTER

(71) Applicant: Glen Heffernan, Reseda, CA (US)

(72) Inventor: Glen Heffernan, Reseda, CA (US)

(*) Notice: Subject to any disclaimer, the term of this patent is extended or adjusted under 35 U.S.C. 154(b) by 0 days.

(21) Appl. No.: 16/351,117

(22) Filed: Mar. 12, 2019

(51) Int. Cl.
| | | |
|---|---|---|
| *E04H 4/16* | (2006.01) | |
| *C02F 1/00* | (2006.01) | |
| *B01D 29/31* | (2006.01) | |
| *B01D 35/30* | (2006.01) | |
| *B01D 35/34* | (2006.01) | |
| *C02F 103/42* | (2006.01) | |

(52) U.S. Cl.
CPC ............ *E04H 4/1618* (2013.01); *B01D 29/31* (2013.01); *B01D 35/306* (2013.01); *B01D 35/34* (2013.01); *C02F 1/001* (2013.01); *B01D 2201/12* (2013.01); *B01D 2201/265* (2013.01); *B01D 2201/306* (2013.01); *C02F 2103/42* (2013.01); *C02F 2201/008* (2013.01); *E04H 4/1654* (2013.01)

(58) Field of Classification Search
CPC ... E04H 4/1618; E04H 4/1654; B01D 35/306; B01D 29/31; B01D 35/34; B01D 2201/265; B01D 2201/12; B01D 2201/306; C02F 1/001; C02F 2103/42; C02F 2201/008
USPC ...................... 210/167.1, 167.16, 232; 15/1.7
See application file for complete search history.

(56) References Cited

U.S. PATENT DOCUMENTS

| | | | | |
|---|---|---|---|---|
| 3,688,908 | A * | 9/1972 | Myers ................... | E04H 4/1654 210/167.16 |
| 4,064,586 | A * | 12/1977 | Caron ................... | E04H 4/1654 15/1.7 |
| 8,128,815 | B1 * | 3/2012 | Simmons ............... | A01K 63/10 15/1.7 |
| 2013/0105374 | A1 * | 5/2013 | Hegi ....................... | C02F 1/001 210/167.1 |
| 2013/0146106 | A1 * | 6/2013 | Erlich ...................... | B08B 9/08 134/34 |
| 2013/0152317 | A1 * | 6/2013 | Erlich ...................... | B08B 9/08 15/1.7 |
| 2017/0284115 | A1 * | 10/2017 | Rejniak ................ | B01D 29/114 |
| 2017/0321441 | A1 * | 11/2017 | Laydera-Collins ..... | C02F 1/001 |

* cited by examiner

*Primary Examiner* — Fred Prince
(74) *Attorney, Agent, or Firm* — James A. Italia; Italia IP

(57) ABSTRACT

A filter holder for holding an open ended filter having an open proximal end and an open distal end in an operative position on a swimming pool cleaner having a pipe stub for receiving one open end of the filter is shown and described. The filter holder includes a cap for covering one open end of the filter, a coupler configured to cooperate with and engage the pipe stub, and a spanning connector configured to span and connect the cap and the coupler outside the pipe stub of the filter. The coupler may include L-shaped brackets. A constricting collar pins the brackets to the pipe stub. The spanning connector may include compression rods and nuts. The filter holder may include an optional adapter collar separable from the coupler, to adapt diameters of the coupler and the pipe stub. The invention may alternatively be considered to be a mobile swimming pool cleaner having a pleated medium filter rather than a flaccid bag filter.

14 Claims, 4 Drawing Sheets

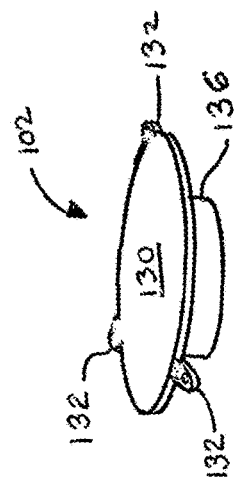
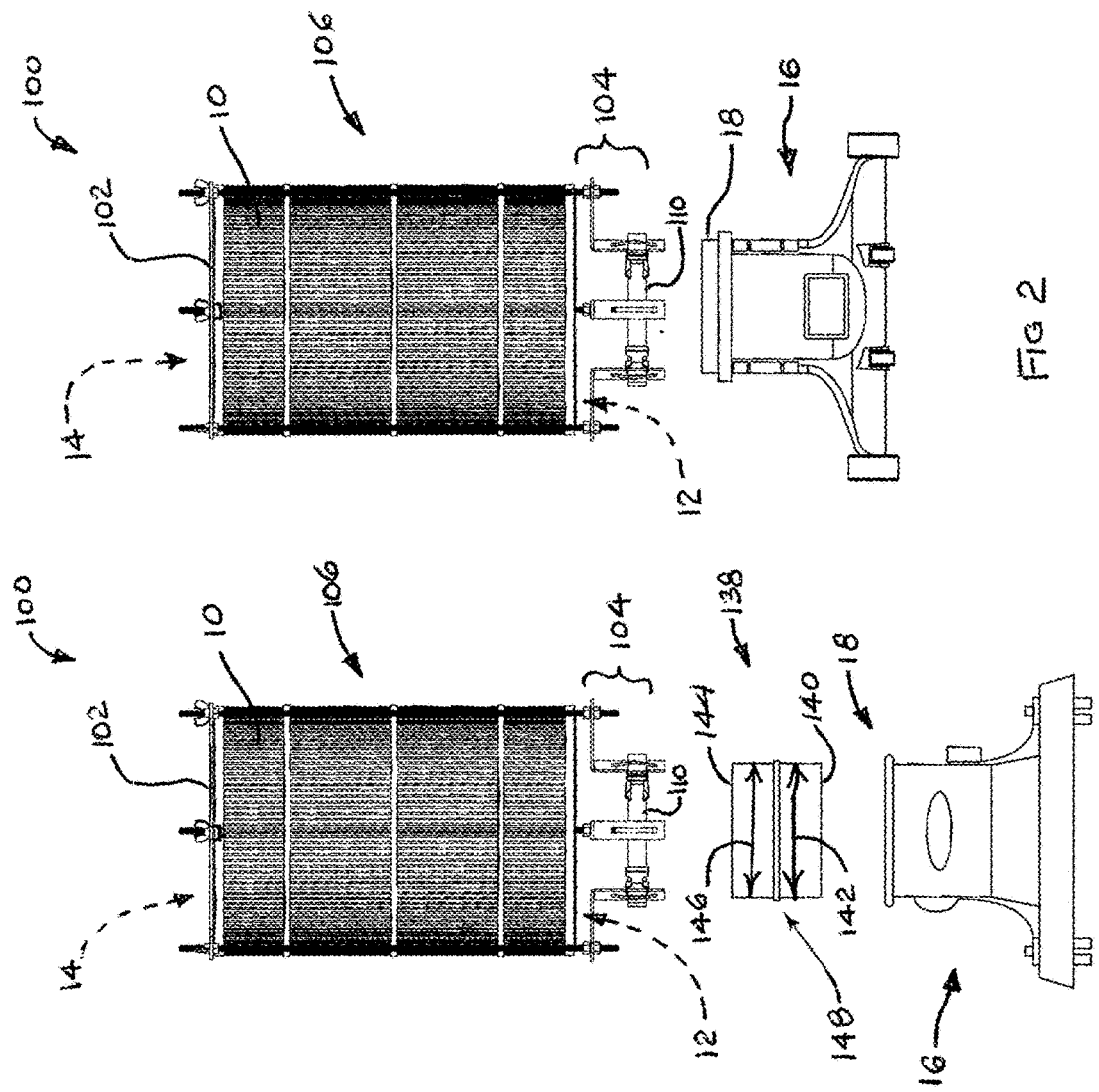

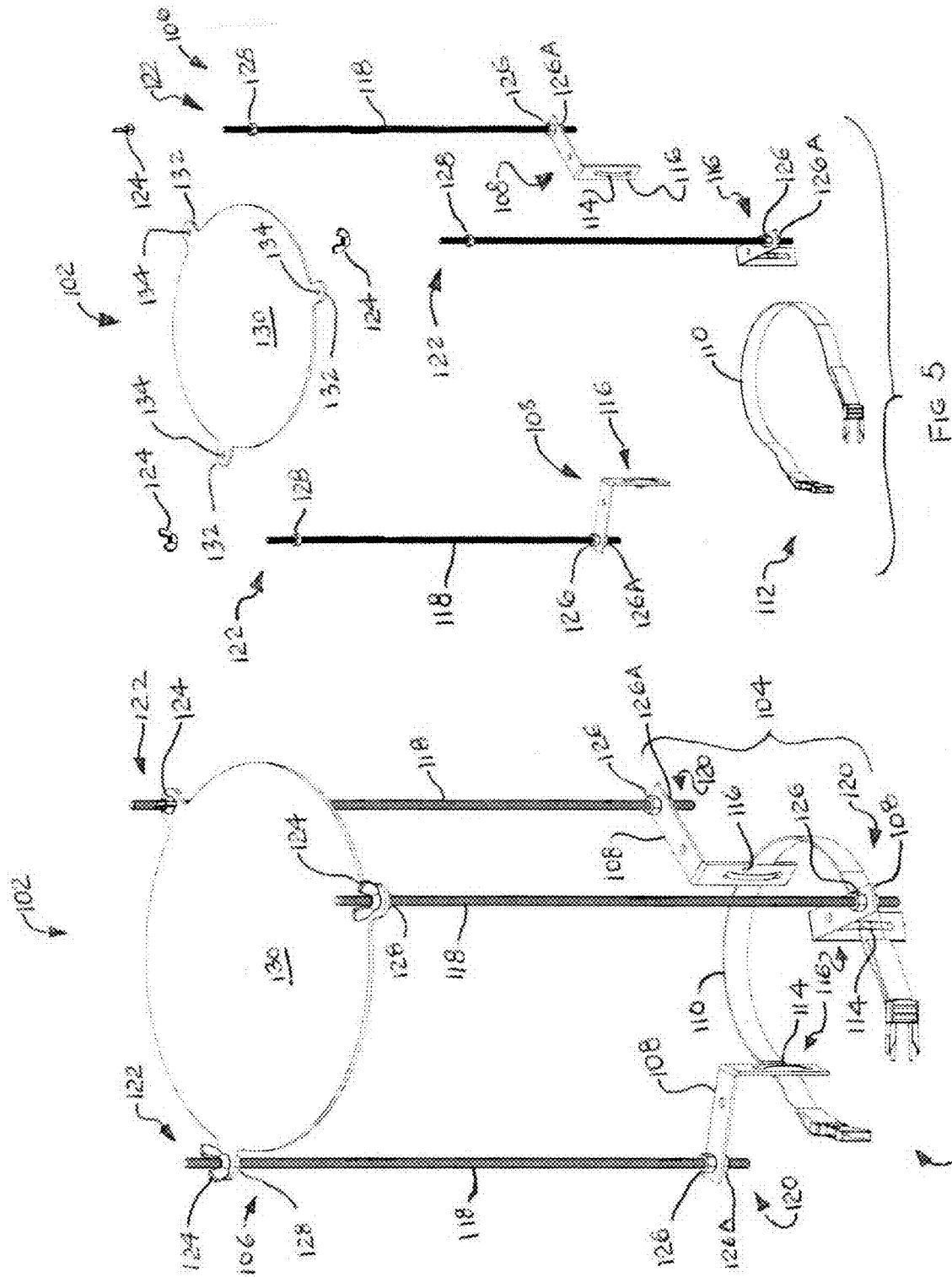

SWIMMING POOL CLEANER WITH PLEATED MEDIUM FILTER

FIELD OF THE INVENTION

The present invention relates to mobile water filters for swimming pool cleaners, and more particularly, to a holder adapted to secure a cylindrical filter in place on a pool cleaner.

BACKGROUND OF THE INVENTION

Swimming pools must periodically be cleared of debris which accumulates in swimming water. Mobile suction based pool cleaners have been provided to meet this need. A typical pool cleaner utilizes a bag as the actual filter. The neck of the bag closes over and is held to an annular conduit terminus, such as a pipe stub which is part of the pool cleaner.

Filter bags provide insufficient filtration area for some situations for any given length and girth of the filter. Also, particle mesh size ratings of bag filters for swimming pools may be insufficiently small to trap some particles. Pleated cylindrical filters are superior in both aspects, but are not attachable to the pipe stub as is a bag type filter. A bag filter is closed, whereas pleated cylindrical filters generally have open opposed ends—but may also have a solid end cap. One end must be connected to the pipe stub, but the other must be closed, or else water being filtered will be discharged ineffectively through the open end without undergoing filtration.

There exists a need for a filter holder adapted to secure a cylindrical open ended filter in place effectively on a pool cleaner.

SUMMARY OF THE INVENTION

The present invention contemplates a filter holder for holding an open ended pleated filter having opposed open ends in an operative position on a mobile swimming pool cleaner, in place of a flaccid bag type filter. Pleated filters are currently commercially fabricated with opposed open ends or with a solid end cap on one end, so that the filter holder must close and seal that open end distant from a pipe stub structure receiving the previously used bag filter. Closing the open end prevents water being filtered from being ineffectually discharged from the filter without passing through the pleated filter element. The filter holder includes a cap for covering and sealing one open end of the filter, and a coupler securing an opposed end of the filter to the pipe stub of the mobile swimming pool cleaner. The cap and the coupler are drawn towards one another by the coupler, thereby clamping the filter stably between elements of the coupler. The coupler also engages the pipe stub of the swimming pool cleaner, thereby mounting the filter in place on the swimming pool cleaner.

An optional adapter may be provided to adapt filters to pipe stubs not matching and mating to any given filter.

The present invention provides improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a partially exploded, environmental side view of a filter, filter holder, and swimming pool cleaner, according to at least one aspect of the invention;

FIG. 2 is similar to FIG. 1, but illustrates a second style of swimming pool cleaner, and omits an optional adapter shown in FIG. 1;

FIG. 5 is an exploded, perspective view of filter holder components shown in FIGS. 3 and 4, shown isolated from their associated filter and swimming pool cleaner;

FIG. 6 is a perspective view of FIG. 5, with the components shown assembled together;

FIG. 7 is a perspective detail view of an alternative configuration of a component seen at the top of FIG. 3.

DETAILED DESCRIPTION

Figure 3:
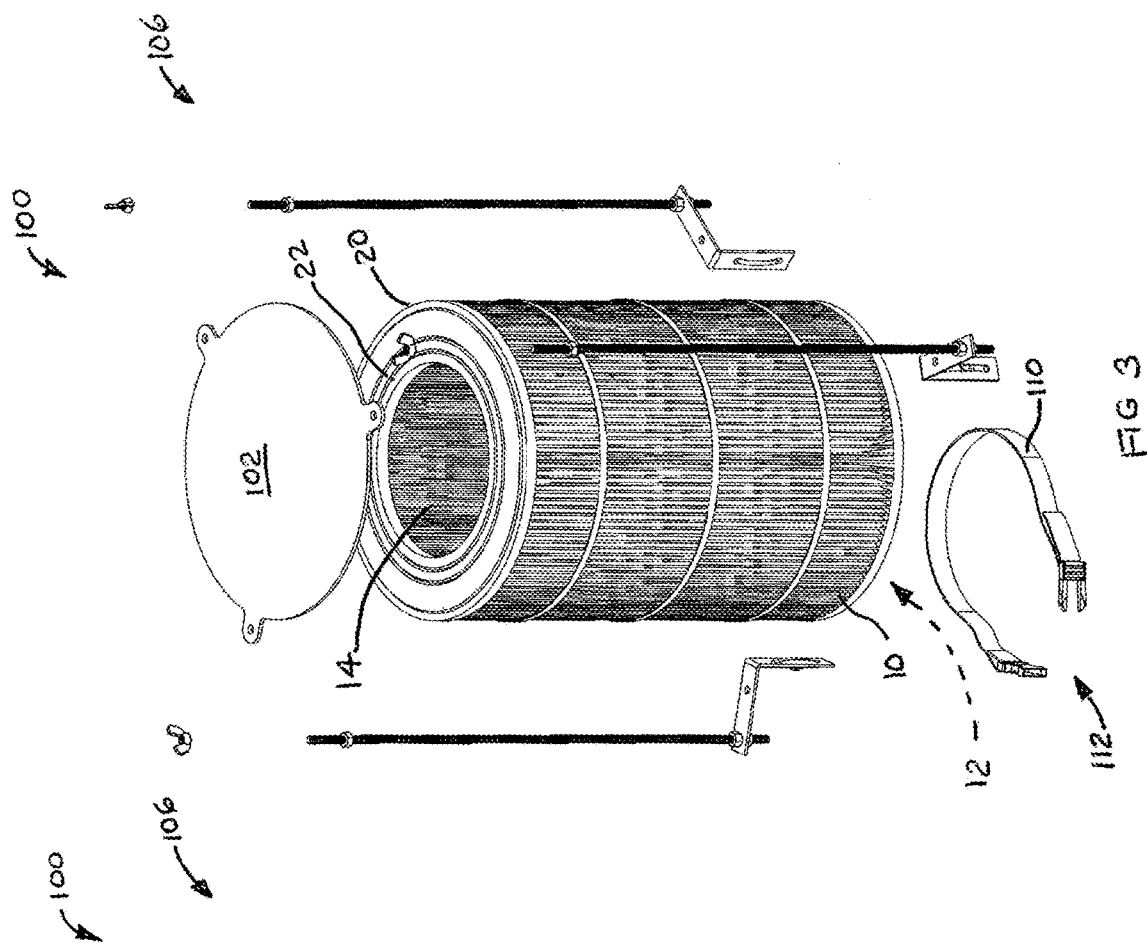
FIG. 3 is an exploded, perspective view of the filter and filter holder of FIG. 1.
Figure 4:
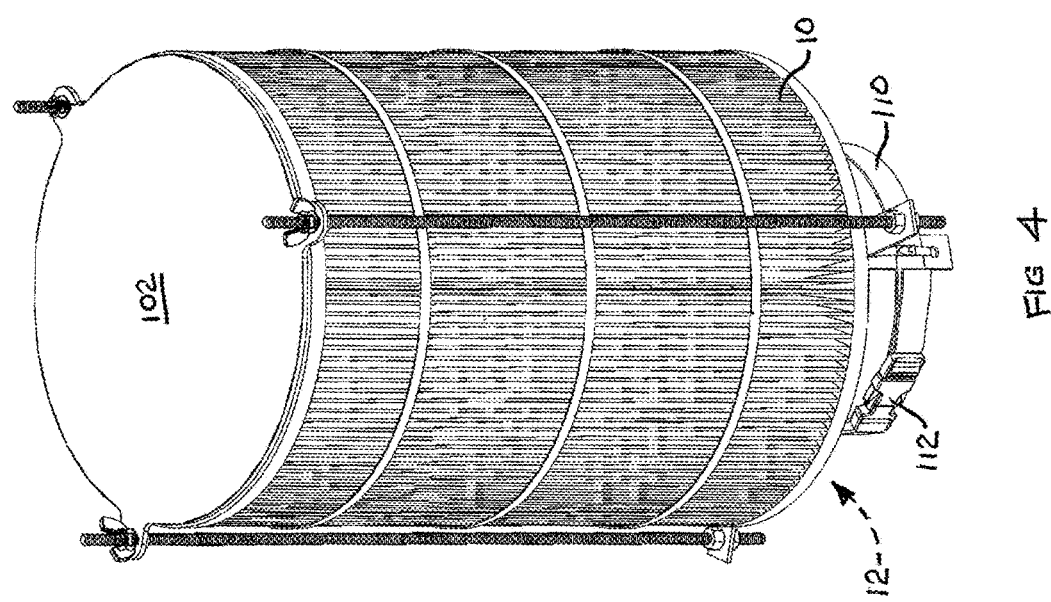
FIG. 4 is a perspective view of FIG. 3, showing components assembled together.

Referring first to FIGS. 1-6, according to at least one aspect of the invention, there is shown a filter holder 100 for holding an open ended filter 10 having an open proximal end 12 and a distal end 14 in an operative position on a swimming pool cleaner 16 having a pipe stub 18 (FIGS. 1 and 2) for receiving an open end (at either proximal or distal ends 12 or 14) of open ended filter 10. Filter holder 100 may comprise a cap 102 for engaging distal end 14 of open ended filter 10, a coupler 104 configured to cooperate with and engage pipe stub 18 of swimming pool cleaner 16, and a spanning connector 106 configured to span and connect cap 102 and coupler 104 outside open ended filter 10.

Figure 8:
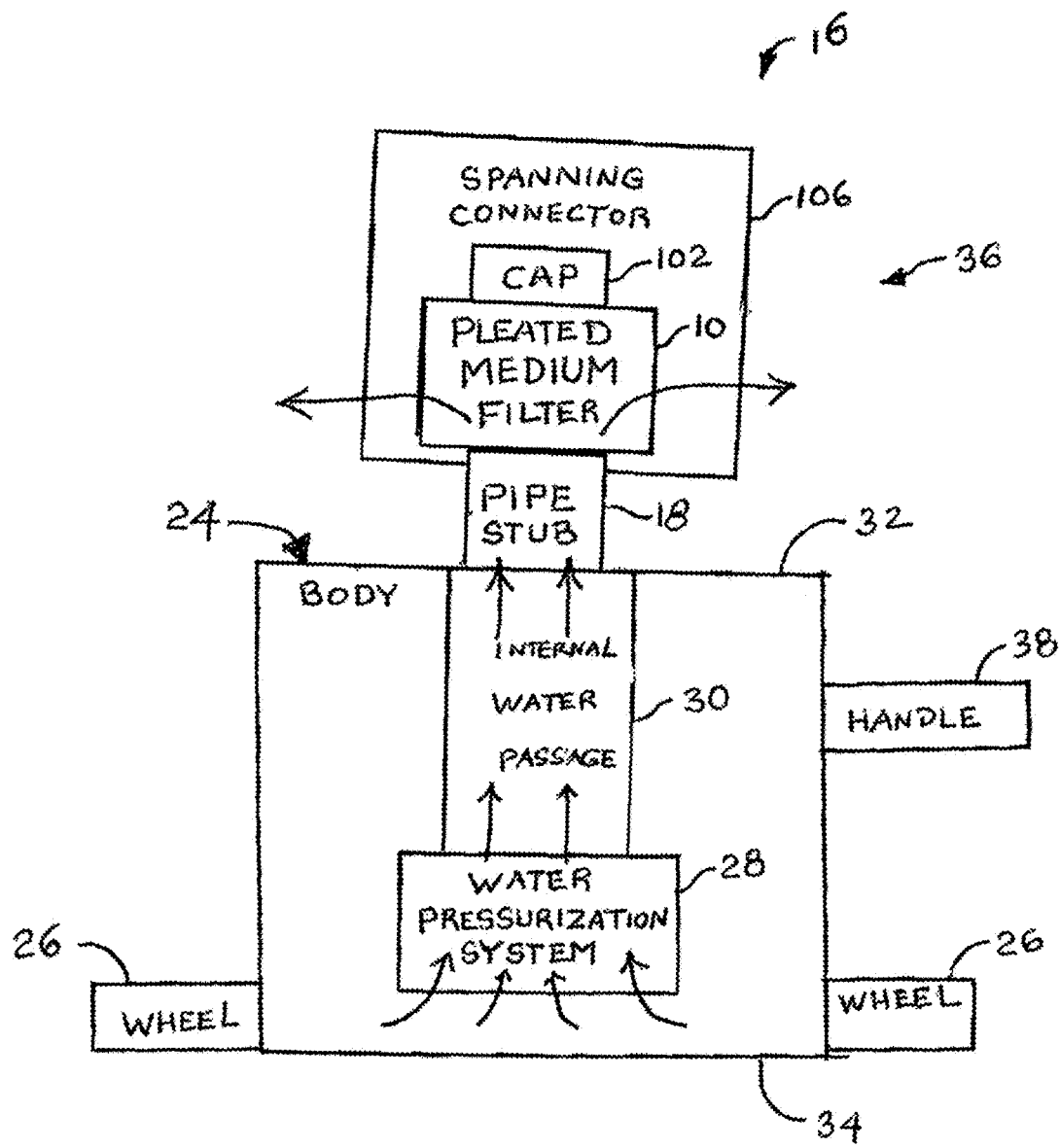
FIG. 8 is a nested block diagram of a swimming pool cleaner having a pleated medium filter coupled thereto.

Swimming pool cleaner 16 is of the hand operated type, having wheels 26 (FIG. 8) for navigating swimming pool surfaces (not shown), and typically, a handle 38 (FIG. 8) enable the operator to steer. Swimming pool cleaner 16 may be self-propelled, or alternatively, propelled by the operator. Water under pressure circulates through a filter which is part of swimming pool cleaner 16, as shown in FIG. 8.

Cap 102 may entirely cover distal end 14 of open ended filter 10. However, it should be noted that in open ended filter 10, either only proximal end 12 is open, or alternatively, both proximal and distal ends 12 and 14 may be open. Cap 102 may therefore be modified for example by having a central opening to enable a projection built into a solid end cap (not shown) of open ended filter 10. Cap 102 may include other variations, such as incorporating an outer depending wall to surround an upper portion of open ended filter 10, or otherwise modified to improve stability of retention of open ended filter 10. Cap 102 may include elements of coupler 104 for example.

It should be noted at this point that orientational terms such as upper and over refer to the subject drawing as viewed by an observer. The drawing figures depict their subject matter in orientations of normal use, which could obviously change with changes in posture and position of novel filter holder 100. Therefore, orientational terms must be understood to provide semantic basis for purposes of description, and do not limit the invention or its component parts in any particular way.

As best seen in FIGS. 3 and 5, coupler 104 may comprise a plurality of brackets 108 abutting pipe stub 18 when filter holder 100 is installed on pipe stub 18, and a spanning member engaging each one of brackets 108 when filter holder 100 is installed on pipe stub 18. Spanning connector 106 may further comprise a constrictive collar 110 configured to urge brackets 108 against pipe stub 18 when filter holder 100 is installed on pipe stub 18. Constrictive collar 110 may comprise a manual clip buckle 112 configured to be closed by snap fit when constrictive collar 110 is installed on pipe stub 18, and to be opened by manual constriction to release constrictive collar 110 and brackets 108 from engagement with pipe stub 18.

Brackets 108 may be L-shaped as illustrated herein, although obviously, many other configurations may be employed. Plural brackets 108 may be replaced by one component if desired.

Constrictive collar 110 is configured to constrict over brackets 108 and pipe stub 18 when filter holder 100 is installed on pipe stub 18. Each bracket 108 may include a loop 114 (called out in FIGS. 5 and 6) configured to captively couple constrictive collar 110 to its respective bracket 108. Brackets 108 may be L-shaped as shown. This enables bracket 108 to present an engagement surface 116 to contact pipe stub 18.

In the example illustrated herein, spanning connector 106 is an assembly of subcomponents. Spanning member 106 may comprise a first spanning member engaging one of brackets 108. Spanning connector 106 may further comprise at least a second spanning member engaging a respective second one of brackets 108. For example, the first spanning member and each second spanning member may comprise a threaded rod 118 including a proximal end 120 (called out in FIGS. 5 and 6) configured to engage one of brackets 108 and a distal end 122 configured to engage cap 102.

Unless otherwise indicated, the terms "first", "second", etc., are used herein merely as labels, and are not intended to impose ordinal, positional, or hierarchical requirements on the items to which these terms refer. Moreover, reference to, e.g., a "second" item does not either require or preclude the existence of, e.g., a "first" or lower-numbered item, and/or, e.g., a "third" or higher-numbered item.

In the illustrated examples, spanning member 106 may comprise a first nut 124 threadable to at least one of proximal end 120 and distal end 122 of threaded rod 118, to enable assembly and disassembly of spanning member 106. Filter holder 100 may further comprise a second nut 126 threadable to another one of proximal end 120 and distal end 122 of threaded rod 118. Cap 102 and brackets 108 may be clamped between each one of a pair of fasteners (e.g., nuts 124 or 126). Therefore, filter holder 100 may further comprise, for each threaded rod 118, a third nut 126 and a fourth nut 126A threadable to threaded rod 118, so that when filter holder 100 is installed on pipe stub 18, cap 102 is sandwiched between two nuts 124, 128 at each threaded rod 118, and each bracket 108 is sandwiched between two nuts 126, 126A at each threaded rod 118.

In anticipation that filter holder 100 will be periodically removed to facilitate replacement of filter 10, nuts 124 may be wing nuts, the latter being readily grasped by finger for threading on and off. Remaining nuts 126 and 128 may or may not be winged. Nuts 126 may be permanently tightened at selected positions appropriate for effective engagement of brackets 108 with pipe stub 18.

Cap 102 may comprise a flat plate 130 (called out in FIGS. 5 and 6) and at least one projection 132 projecting from flat plate 130. Flat plate 130 may be configured to be received in close cooperation with one of an outer circumference 20 (see FIG. 3) of open ended filter 10 and an inner surface 22 (see FIG. 3) of at least one of open proximal end 12 and open distal end 14 of open ended filter 10. Alternatively stated, plate 130 may reflect a shape and transverse dimensions of proximal and distal ends 12, 14 (FIG. 3), thus assuring sealing of open ends 12, 14 with minimal overhang outside open ends 12, 14 or outside outer circumference 20. Where such close fit or correspondence occurs, cap 102 will include tabs or projections 132 each including a hole 134 to enable passage of threaded rod 118.

Referring specifically to FIG. 7, cap 102 may include a depending projection 136 dimensioned and configured to fit open proximal end 12 or open distal end 14 of open ended filter 10. Depending projection 136 may facilitate centering cap 102 over open ended filter 10 and acts to drive the water to exit through the filter rather than the open end, and may engage the latter by friction if desired. Depending projection 136 may comprise a low circular wall as illustrated, or alternatively, may comprise a wall defining less than a full circle, or still further, a plurality of projections (the two latter options are not shown). Note that if a filter with an end cap is utilized, the cap 102 would not require a depending projection 136.

Turning to FIG. 1, wherein coupler 104 and pipe stub 18 do not interfittingly cooperate with one another, filter holder 100 may further comprise an adapter 138 manually separable from coupler 104. Adapter 138 is configured to interfittingly cooperate with coupler 104 and also with pipe stub 18 to enable effective and stable attachment of filter holder 100 with pipe stub 18. Adapter 100 may comprise a tube further comprising a proximal end 140 having a first external transverse dimension 142 and a distal end 144 having a second external transverse dimension 146, and an outward projection 148 between proximal end 140 and distal end 144. Although shown as a continuous flange, outward projection 148 may comprise a discontinuous circular wall or alternatively, a plurality of projections.

When first installed on swimming pool cleaner 16, cap 102 and coupler 104 may be assembled over open ended filter 10, and then to pipe stub 18. Alternatively, connection to pipe stub 18 may be made prior to installing filter 10. After filter holder 100 is suitably and stably positioned on pipe stub 18, all fasteners (e.g., nuts 124, 126, 126A, 128) may be fully tightened. In subsequent operations wherein filter 10 is being renewed or otherwise serviced, only first nuts 124 need be removed and replaced.

FIG. 8 shows a swimming pool cleaner (e.g., swimming pool cleaner 16) for filtering water in a swimming pool (not shown). The swimming pool cleaner may comprise a body 24 including an upper side 32, a lower side 34, and a plurality of wheels 26 located at lower side 34, an internal water passage 30 within body 24, and a filter assembly 36 at one end of internal water passage 30. Internal water passage 30 terminates at filter assembly 36. Water flowing within water passage 30 is constrained to flow through filter assembly 36. Filter assembly 36 comprises a pleated medium filter (e.g., open ended filter 10) having a shape, and is of sufficient rigidity to maintain the shape in the presence of gravity but no other forces. Pleated medium filters typically have an accordion pleated paper filtration element, and rubber end rings holding the filtration element in a selected configuration, typically cylindrical. The end rings typically have openings at each end of the filter, so that the filter may be installed with either end at the inlet of the fluid being filtered.

The swimming pool cleaner may be any robotic or hand maneuvered swimming pool cleaner supplied with water pressurization, and is shown generically as all currently known commercial models of mobile swimming pool cleaners may be utilized as the swimming pool cleaner. Therefore, the swimming pool cleaner will be understood to include a water pressurization system 28. Water pressurization system 28 may comprise a pneumatic or hydraulic motor rotatably driving a water impeller for example. To this end, the pneumatic motor is provided with a hose (not shown) conducting compressed air from an external source. Alternatively, water pressurization system 28 may be electrically operated, using an onboard battery (not shown), for example.

Internal water passage 30 may open at upper side 32 of body 24.

A direction of flow of water from internal water passage 30 into pleated medium filter (e.g., open ended filter 10) is upward. Water flow is indicated by unnumbered arrows in FIG. 8. Body 24 includes openings (not shown) to admit surrounding pool water thereinto, and hence into water pressurizations system 28. Pipe stub 18 is typical of all known mobile swimming pool cleaners, and has erstwhile been utilized for attachment of a bag type water filter (not shown).

Of course, if desired, direction of water flow could be reversed from the direction shown in FIG. 8.

Therefore, body 24 includes pipe stub 18 at upper end 32 of internal water passage 30, and the pleated medium filter mounts to pipe stub 18 when installed. The swimming pool cleaner may further comprise spanning connector 106 (previously described) configured to surround and retain the pleated medium filter to pipe stub 18.

The swimming pool cleaner may include a handle 38 for maneuvering by hand.

The present invention is susceptible to modifications and variations which may be introduced thereto without departing from the inventive concepts. For example, elements including pipe stub and filter may be other than circular, such as square, rectangular, or even irregular. Also, while coupler 104 has been described in terms of surrounding pipe stub 18, it would be possible to fashion an coupler (not illustrated) dimensioned and configured to enter an interior of pipe stub 18, and secure connection by means of expansive elements.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A filter holder for holding an open ended filter having an open proximal end and a distal end in an operative position on a swimming pool cleaner having a pipe stub for receiving an open end of the open ended filter, the filter holder comprising:
    a cap for covering the distal end of the open ended filter;
    a coupler configured to cooperate with and engage the pipe stub of the swimming pool cleaner; and
    a spanning connector configured to span and connect the cap and the coupler outside the open ended filter, wherein the spanning connector comprises a plurality of brackets abutting the pipe stub when the filter holder is installed on the pip stub, and a spanning member engaging each one of the brackets when the filter holder is installed on the pipe stub.

2. The filter holder of claim 1, wherein the spanning connector further comprises an constrictive collar configured to urge the brackets against the pipe stub when the filter holder is installed on the pipe stub.

3. The filter holder of claim 2, wherein the constrictive collar comprises a manual clip buckle configured to be closed by snap fit when the constrictive collar is installed on the pipe stub, and to be opened by manual constriction to release the constrictive collar and the brackets from engagement with the pipe stub.

4. The filter holder of claim 2, wherein the constrictive collar is configured to constrict over the brackets and the pipe stub when the filter holder is installed on the pipe stub.

5. The filter holder of claim 4, wherein each said bracket includes a loop configured to captively couple the constrictive collar to its respective bracket.

6. The filter holder of claim 1, wherein the spanning connector comprises a first spanning member engaging one of the brackets, and the spanning connector further comprises at least a second spanning member engaging a respective second one of the brackets.

7. The filter holder of claim 6, wherein the first spanning member and each said second spanning member comprises a threaded rod including a proximal end configured to engage one of the brackets and a distal end configured to engage the cap.

8. The filter holder of claim 7, further comprising a first nut threadable to at least one of the proximal end and the distal end of said threaded rod, to enable assembly and disassembly of the spanning member.

9. The filter holder of claim 8, further comprising a second nut threadable to another one of the proximal end and the distal end of said threaded rod.

10. The filter holder of claim 9, further comprising, for each said threaded rod, a third nut and a fourth nut threadable to the threaded rod, so that when the filter holder is installed on the pipe stub, the cap is sandwiched between two nuts at each said threaded rod, and each said bracket is sandwiched between two nuts at each said threaded rod.

11. The filter holder of claim 1, wherein the cap comprises a flat plate and at least one projection projecting from the flat plate, wherein the flat plate is configured to be received in close cooperation with one of an outer circumference of the open ended filter and an inner surface of at least one of the open proximal end and the open distal end of the open ended filter.

12. The filter holder of claim 1, wherein the cap includes a depending projection dimensioned and configured to fit the open proximal end or the open distal end of the open ended filter.

13. The filter holder of claim 1, wherein the coupler and the pipe stub do not interfittingly cooperate with one another, the filter holder further comprising an adapter manually separable from the coupler, and wherein the adapter is configured to interfittingly cooperate with the coupler and also with the pipe stub.

14. The filter holder of claim 13, wherein the adapter comprises a tube further comprising a proximal end having a first external transverse dimension and a distal end having a second external transverse dimension, and an outward projection between the proximal end and the distal end.

* * * * *